(12) United States Patent
Austin

(10) Patent No.: US 10,595,601 B2
(45) Date of Patent: Mar. 24, 2020

(54) TROLLEY MECHANISM FOR WHEELED LUGGAGE

(71) Applicant: Kenneth Austin, Thomastown (AU)

(72) Inventor: Kenneth Austin, Thomastown (AU)

( * ) Notice: Subject to any disclaimer, the term of this patent is extended or adjusted under 35 U.S.C. 154(b) by 0 days.

(21) Appl. No.: 16/305,300

(22) PCT Filed: Nov. 18, 2016

(86) PCT No.: PCT/AU2016/051108
§ 371 (c)(1),
(2) Date: Nov. 28, 2018

(87) PCT Pub. No.: WO2017/219059
PCT Pub. Date: Dec. 28, 2017

(65) Prior Publication Data
US 2019/0328095 A1 Oct. 31, 2019

(30) Foreign Application Priority Data
Jun. 21, 2016 (AU) ............................ 2016902420

(51) Int. Cl.
*A45C 5/14* (2006.01)
*A45C 9/00* (2006.01)
(Continued)

(52) U.S. Cl.
CPC .................. *A45C 9/00* (2013.01); *A45C 5/03* (2013.01); *A45C 5/14* (2013.01); *A45C 13/262* (2013.01); *A45C 2013/267* (2013.01)

(58) Field of Classification Search
CPC .......... A45C 5/145; A45C 13/385; A45C 5/14
(Continued)

(56) References Cited

U.S. PATENT DOCUMENTS 4,593,841 A * 6/1986 Lange ...................... A45C 9/00
224/153
10,076,167 B2 * 9/2018 Kim ........................ A45C 5/03
(Continued)

FOREIGN PATENT DOCUMENTS

| EP | 0187318 A1 | 7/1986 |
| FR | 2794951 B1 | 8/2001 |
| WO | 1998008721 A1 | 3/1998 |

OTHER PUBLICATIONS

International Search Report & Written Opinion dated Feb. 21, 2017 from PCT Application No. PCT/AU2016/051108.
(Continued)

*Primary Examiner* — Sue A Weaver
(74) *Attorney, Agent, or Firm* — Innovation Capital Law Group, LLP; Vic Lin

(57) ABSTRACT

There is provided a trolley mechanism for wheeled luggage, the wheeled luggage comprising four luggage wheels at a lower surface of the wheeled luggage and a deployable trolley handle at an upper surface of the wheeled luggage such that, in use, the wheeled luggage may be manoeuvred about by the deployable trolley handle in a substantially upright orientation supported by the luggage wheels and wherein the trolley mechanism comprising a deployable trolley deck, the trolley deck being pivotally coupled substantially at the lower surface of the wheeled luggage at a proximal edge of the trolley deck and having at least one trolley wheel at an opposite distal end of the trolley deck such that the deployable trolley deck is pivotally configurable between: a stowed configuration wherein the trolley deck lies against a surface of the wheeled luggage; and a deployed configuration wherein the trolley deck is deployed at a substantial right angle to the surface such that, when the wheeled luggage is in the substantially upright orientation and supported by the luggage wheels, the trolley deck
(Continued)

defines an upper load bearing surface for supporting additional luggage thereon and wherein the trolley deck is supported at the distal end thereof by the at least one trolley wheel.

11 Claims, 3 Drawing Sheets

(51) Int. Cl.
*A45C 5/03* (2006.01)
*A45C 13/26* (2006.01)

(58) Field of Classification Search
USPC .................................................. 190/15.1, 102
See application file for complete search history.

(56) References Cited

U.S. PATENT DOCUMENTS

| | | |
|---|---|---|
| 2004/0069583 A1 | 4/2004 | Tamura |
| 2005/0156002 A1 | 7/2005 | Neal et al. |
| 2011/0214957 A1* | 9/2011 | Barnard .................. A45C 5/14 |
| | | 190/15.1 |
| 2011/0247910 A1 | 10/2011 | Darvish et al. |
| 2014/0190780 A1 | 7/2014 | Blazure |

OTHER PUBLICATIONS

International Preliminary Report on Patentability (Chapter II) dated May 3, 2018 from PCT Application No. PCT/AU2016/051108.

* cited by examiner

TROLLEY MECHANISM FOR WHEELED LUGGAGE

FIELD OF THE INVENTION

The present invention relates to travel luggage and in particular, but not necessarily entirely, to a trolley mechanism for wheeled luggage.

SUMMARY OF THE DISCLOSURE

According to a first aspect, there is provided a trolley mechanism for wheeled luggage, the wheeled luggage comprising four luggage wheels at a lower surface of the wheeled luggage and a deployable trolley handle at an upper surface of the wheeled luggage such that, in use, the wheeled luggage may be manoeuvred about by the deployable trolley handle in a substantially upright orientation supported by the luggage wheels and wherein the trolley mechanism comprising a deployable trolley deck, the trolley deck being pivotally coupled substantially at the lower surface of the wheeled luggage at a proximal edge of the trolley deck and having at least one trolley wheel at an opposite distal end of the trolley deck such that the deployable trolley deck is pivotally configurable between: a stowed configuration wherein the trolley deck lies against a surface of the wheeled luggage; and a deployed configuration wherein the trolley deck is deployed at a substantial right angle to the surface such that, when the wheeled luggage is in the substantially upright orientation and supported by the luggage wheels, the trolley deck defines an upper load bearing surface for supporting additional luggage thereon and wherein the trolley deck is supported at the distal end thereof by the at least one trolley wheel.

The surface of the wheeled luggage may be a rear surface of the wheeled luggage defined by the proximity of the deployable trolley handle.

The trolley mechanism may further comprise releasable fasteners for securing the trolley deck against the rear surface when in the stowed configuration.

The releasable fasteners may comprise at least one peripheral slide fastener.

The trolley deck may define lateral raised side edge portions extending upwardly when the trolley deck may be in the deployed configuration.

The trolley deck may define a distal raised edge portion extending upwardly when the trolley deck may be in the deployed configuration.

The distal raised edge portion may define a handle accommodation allowing the trolley handle to extend therethrough when in the stowed configuration.

The trolley deck may be releasably fastened to the base of the wheeled luggage.

The trolley deck may be releasably fastened to the base of the wheeled luggage by way of slide fastener.

The at least one trolley wheel may be two trolley wheels.

The at least one trolley wheel may be stowable within an underside recess of the trolley deck.

The at least one trolley wheel may be configured for deploying from the underside recess when the trolley deck may be deployed.

The trolley deck may be configured for rigidity along an elongate axis of the trolley deck so as to substantially reduce bending under load.

The trolley deck may comprise at least one rigidity conferring corrugation lined along the elongate axis of the trolley deck.

The trolley mechanism may further comprise a pair of laterally located additional trolley handles located adjacent the deployable trolley handle.

The trolley mechanism may further comprise a deployable pull sled handle located on a front surface of the wheeled luggage and wherein, the deployable pull sled handle may be configurable in a deployed configuration wherein the deployable pull sled handle may be used to pull the wheeled luggage in a sled like manner when the wheeled luggage may be in a horizontal orientation and at least partially supported by the at least one trolley wheel of the trolley deck.

A pair of rearwardly located luggage wheels of the four luggage wheels may jut at substantially 45° so as to be able to at least partially support the wheeled luggage when the wheeled luggage may be both in horizontal and vertical orientations.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
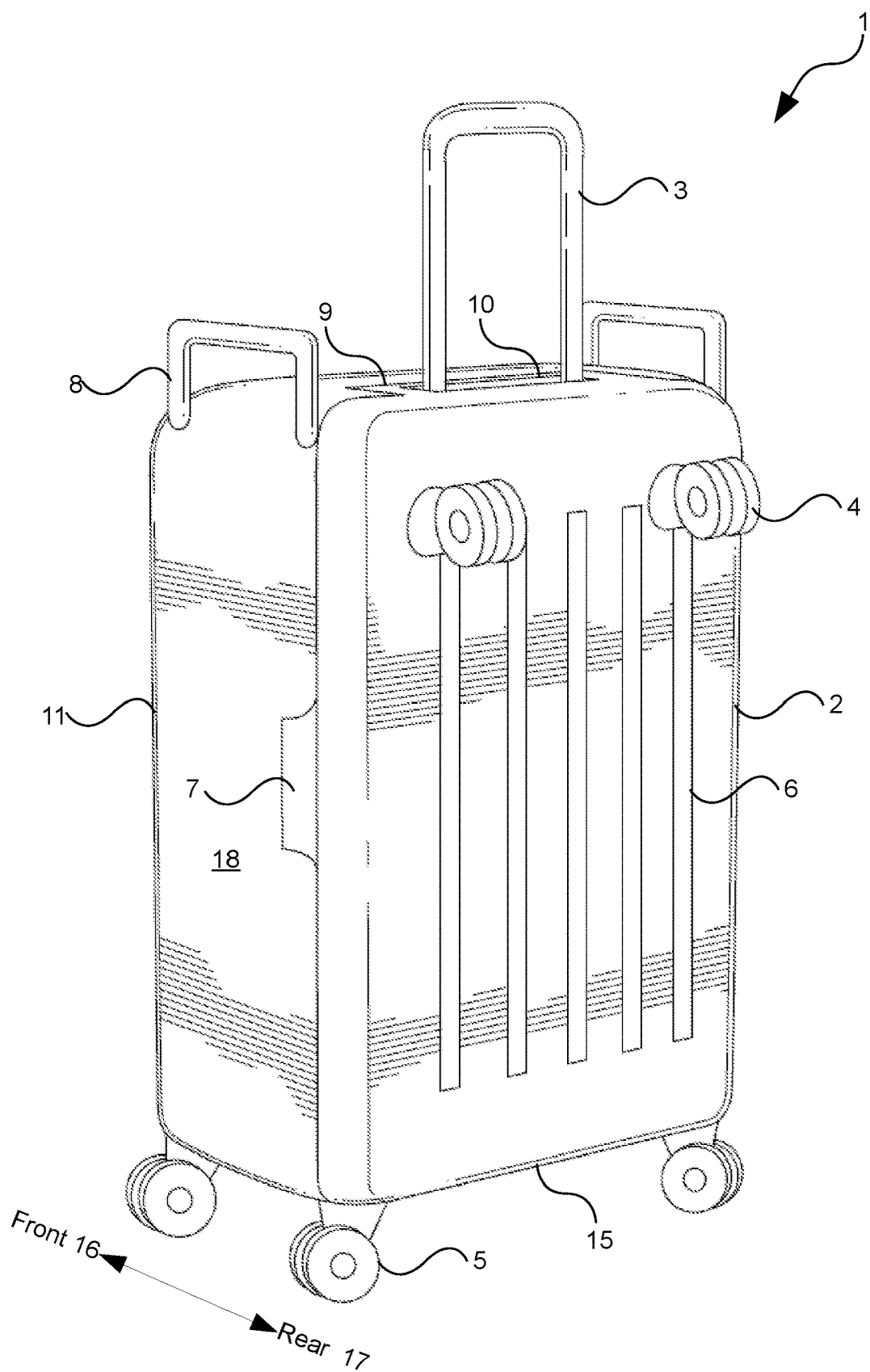
FIG. 1 shows a trolley mechanism for wheeled luggage comprising a trolley deck in a stowed configuration in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the trolley mechanism for wheeled luggage are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

In the embodiments that follow, there is provided a trolley mechanism for wheeled luggage. As will be appreciated from the ensuing description, the trolley mechanism comprises a deployable trolley deck which provides additional luggage carrying capabilities for the wheeled luggage.

Specifically, turning to FIG. 1, there is shown the trolley mechanism 1. The trolley mechanism 1 comprises a deployable trolley deck 2.

The trolley deck 2 may be pivotally coupled to the base of wheeled luggage 11 by way of pivot 15. Furthermore, at a distal end thereof, the trolley deck 2 comprises at least one trolley wheel 4. In the embodiment shown, two distal trolley wheels 4 are provided for lateral stability.

As can be seen from FIG. 1, the wheeled luggage 11 may be conventional travel luggage wherein, as can be seen, the wheeled luggage 11 comprises a generally rectangular body for storing luggage therein, and supported by four luggage wheels 15 at a lower surface thereof and comprising a stowable luggage handle 3 at an upper surface thereof. As such, the wheeled luggage 11 may be manoeuvred about by the luggage handle 3 while being supported by the luggage wheels 5. In embodiments, the luggage wheels 5 may be caster wheels so as to provide omnidirectional manoeuvrability.

In this regard, it should be noted that the trolley mechanism 1 provided herein may be configured for retrofit existing conventional wheeled luggage 11 or, in alternative embodiments, integrally provided during the manufacture thereof. As such, in these embodiments, a consumer may purchase wheeled luggage comprising the trolley mechanism 1 or alternatively purchase the trolley mechanism 1 for retrofit to existing wheeled luggage 1.

As is shown in FIG. 1, and primarily for orientation or descriptive convenience herein, the wheeled luggage 11 defines front 16 and rear 17 surfaces interposed by side surfaces 18 and top and bottom surfaces. As can be seen from the orientation in FIG. 1, when the wheeled luggage 11 is upright so as to be supported by the luggage wheels 15, the front 16 and rear surfaces 17 are vertically orientated.

Now, FIG. 1 shows the trolley deck 2 in a stowed configuration wherein, as can be seen, the trolley deck 2 lies against the front 16 or rear 17 surface of the wheeled luggage 11. As can be appreciated, the front 16 and rear 17 surfaces of the generally rectangular wheeled luggage 11 provide a larger surface area thereby allowing for maximisation of the sizing of the trolley deck 2.

In a preferred embodiment, the trolley deck 2 lies against the rear surface 17. In other words, in the orientation shown in FIG. 1, the rear surface 2 may be defined with reference to the trolley handle 3. As such, in this regard, conventional wheeled luggage 11 typically comprises the trolley handle 3 at a rear surface of the wheeled luggage 11 wherein the front surface 16 comprises the luggage lid, generally sealed by a zip fastener or the like. In general use, when accessing the wheeled luggage 11, the wheeled luggage 11 is generally laid on the rear surface 17 so as to allow the opening of the lid defined by the front surface 16.

As such, in a preferred embodiment wherein the trolley deck 4 lies against the rear surface 17 of the wheeled luggage 11, the trolley deck 4 provides additional structural support for the rear surface 17 of the luggage 11 and furthermore does not hinder the opening of the front surface 16 lid of the luggage 11.

Figure 2:
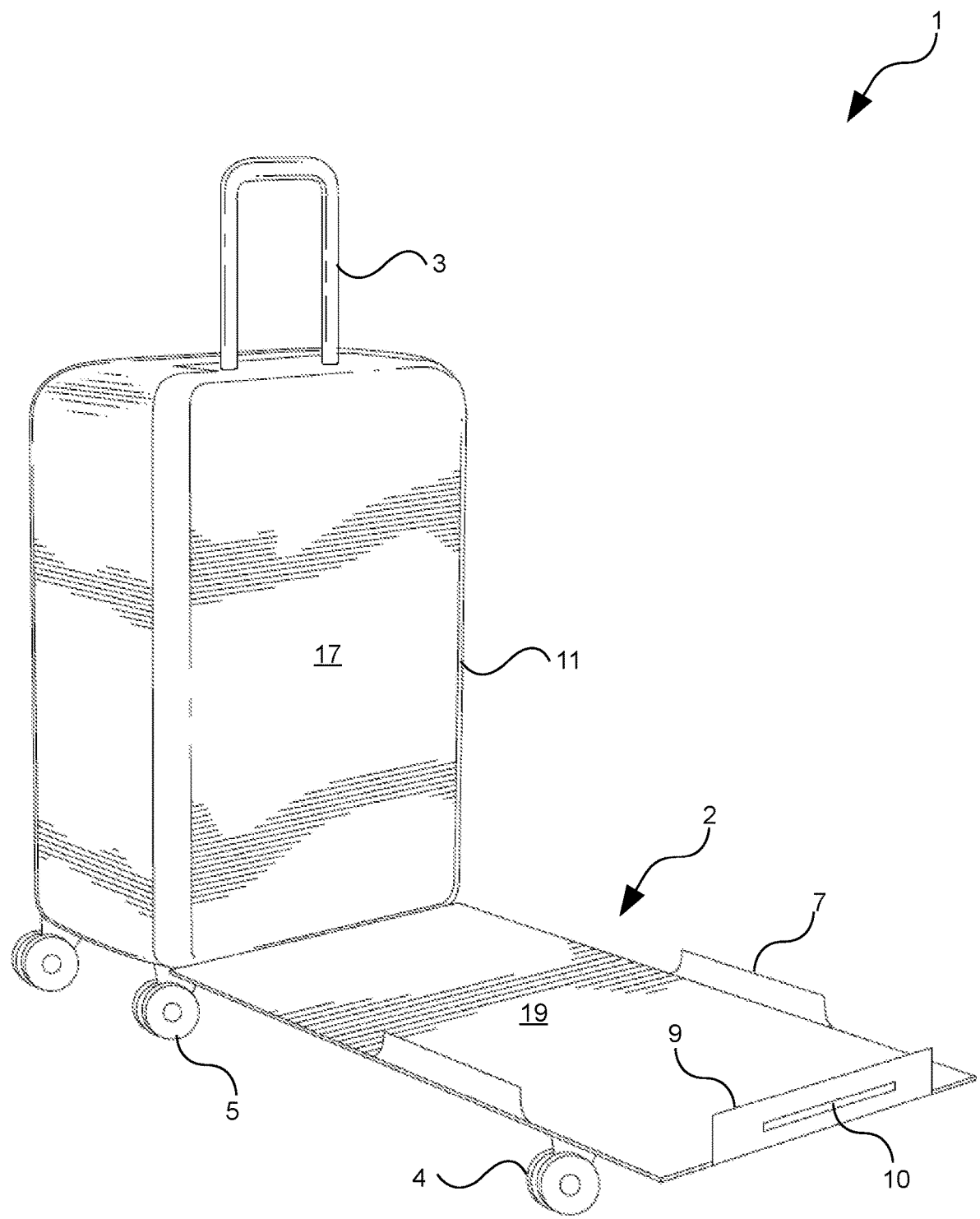
FIG. 2 shows the trolley mechanism comprising the trolley deck in a deployed configuration in accordance with an embodiment of the present disclosure.

Now, turning to FIG. 2, there is shown the trolley deck 2 in a deployed configuration. As can be seen, in the deployed configuration, the trolley deck 2 has pivoted about the pivot point 15 so as to be deployed at a substantially right angle to the rear surface 17 so as to define an upper load bearing surface 19 for supporting additional luggage thereon. As can be further seen from FIG. 2, in the deployed configuration, the trolley deck is supported at the distal end thereof by the at least one trolley wheel 4.

As can be seen from the embodiment shown in FIG. 2, the trolley deck 2 may be substantially planar so as to define a substantially level load bearing surface 19. The trolley deck 2 may be manufactured from a suitably resilient material so as to not substantially bend under the weight of luggage placed thereon. In this regard, the trolley deck 2 may be strengthened along the elongate axis of the trolley deck 2 by way of corrugation folds 6 as is substantially shown in FIG. 1. In alternative embodiments, the trolley deck 2 may comprise structural implants, such as elongate metallic rods or the like for additional or alternative structural integrity.

Now, whereas the embodiment shown in FIG. 2 shows the trolley deck 2 being substantially planar, it should be noted that in certain embodiments, such as that which is shown in FIG. 1, the lateral peripheral edges of the trolley deck 2 may be raised so as to conform around the lateral edges of the wheeled luggage 11.

Furthermore, as is further shown in FIG. 2, lateral edges of the trolley deck 2 may comprise discrete raised lateral side edge portions 17 which extend upwardly when the trolley deck 2 is in the deployed configurations so as to substantially prevent additional luggage placed thereon from inadvertently sliding laterally therefrom.

Furthermore, as can be seen, a distal raised edge portion 9 may also be provided which, in embodiments, may serve similar purposes of preventing the sliding of luggage therefrom.

Furthermore, in embodiments, the distal raised edge portion 9 may define a handle accommodation 10 therein. As such, and as can be seen from FIG. 1, when the trolley deck 2 is in the stowed configuration, the trolley handle 3 may extend through the handle accommodation 10 so as to allow the normal operation of the trolley handle 2, and further secure the trolley deck 2.

In embodiments, the trolley wheels 4 may be stowable. Specifically, in this embodiment, the trolley deck 2 may define and under deck recess (not shown) adjacent each trolley wheel 4 such that, when not required, such as when in the stowed configuration is a substantially shown in FIG. 1, the trolley wheels 4 may be retracted to within the adjacent recesses. In one embodiment, such retraction and extension may be manually implemented wherein each wheel comprises a pivot mechanism and an interference so as to be able to click-in and click-out as required. In further embodiments, a lever mechanism may be coupled between each trolley wheel 4 and the base such that, as the trolley deck 2 is deployed outwardly, the lever deploys the wheels 4 also.

In further embodiments, whereas there is shown the trolley deck 2 comprising two distal trolley wheels 4, additional configurations are envisaged within the purpose of scope of the embodiments provided herein. Specifically, in one embodiment, the trolley deck 2 may comprise one distal trolley wheel 4 be substantially located at a lateral centrepoint of the deck 2, wherein the lateral stability of the trolley deck 2 is provided by virtue of the engagement along the elongate pivot 15 to the base of their wheeled luggage 11.

In further embodiments, the trolley deck 2 may comprise proximal trolley wheels 4 also such that, when in the deployed configuration, the trolley deck 2 is supported by four trolley wheels.

Furthermore, in a preferred embodiment, the trolley wheels 4 are luggage wheels so as to provide omnidirectional manoeuvrability for the trolley deck 2.

In further embodiments, additional luggage handles 8 may be provided for the wheeled luggage 11 so as to further assist in the manoeuvrability of the luggage 11 especially where the trolley deck 2 is deployed. In the embodiment shown, the additional luggage handles 8 may be laterally placed on the side edges 18 of the wheeled luggage 11. As can be appreciated, the additional trolley handles 8 facilitate the steering of the wheeled luggage 11 when the trolley deck 2 is deployed by providing a wider steering base as opposed to the substantially centrally located trolley handle 3. In embodiments, the additional luggage handles 8 may themselves be selectively deployable such as by sliding in and out from the wheeled luggage 11.

Figure 3:
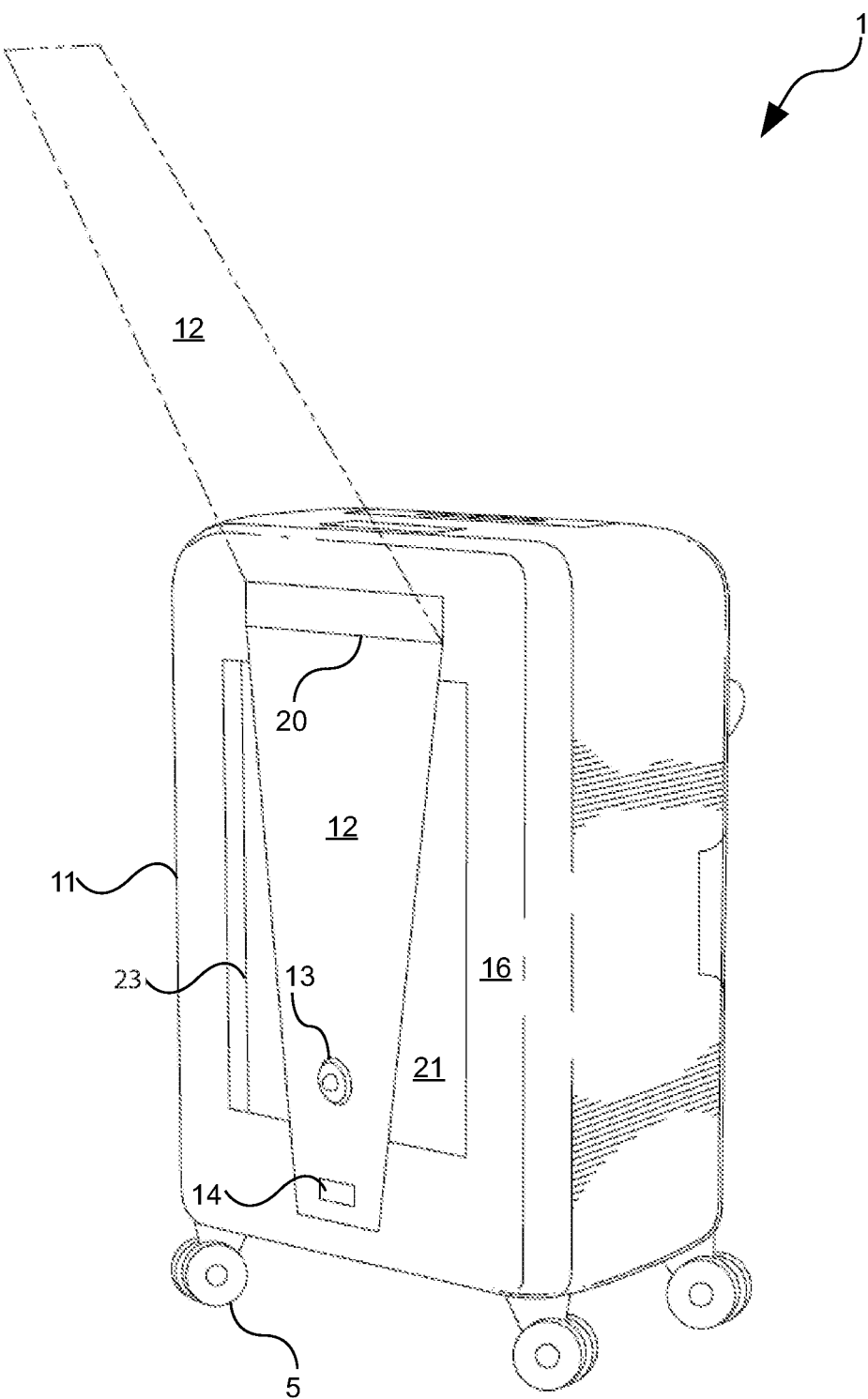
FIG. 3 shows a pull sled handle in accordance with a further embodiment of the present disclosure.

Turning now to FIG. 3, there is shown a further embodiment comprising a deployable pull sled handle 12 allowing the wheeled luggage 11 to be pulled like a sled.

As can be seen from FIG. 3, the pull sled handle 12 is pivotally coupled to the wheeled luggage 11 by way of pivot 20 so as to be able to pivot with respect to the wheeled luggage 11 so as to be configurable between a stowed configuration (as is shown in solid lines) and a deployed configuration (as is shown in dotted lines).

In a preferred embodiment, the pull sled handle 11 is provided on the front surface 16 of the wheeled luggage 11. As such, when in the deployed configuration, the wheeled luggage 11 may slide on the trolley deck 2. Specifically, in one embodiment described above, the trolley deck 2 may comprise four trolley wheels 4 allowing the wheeled luggage 2 to be supported by the four trolley wheels 4 so as to be pulled about by the sled handle 12 and a sled like manner.

In alternative embodiments wherein the trolley deck 2 comprises distally located trolley wheels 4 only, the pair of rearwardly located luggage wheels 5 may jut out at 45° so as to be able to support the luggage 11 in both the vertical and horizontal orientations. In this embodiment, these luggage wheels 5 may be non-castor wheels.

As can be further seen from FIG. 3, the pull sled handle 2 may define a handle 14 which may be gripped by the user in use. Furthermore, the pull sled handle 12 may be fastened in place by way of release fastener 13. Furthermore, a stowage pocket 21 may be provided beneath the handle 12 which may be accessed by lateral slide fastener 23.

In embodiments, the pull sled handle 12 may be substantially rigid so as to provide a push/pull capabilities. However, in alternative embodiments, the pull sled handle 12 need not be so substantially rigid or may even comprise a retractable pull string or the like so as to allow for pull capabilities only.

Having described the above various mechanisms in accordance with the various bottoms, there will now be described in exemplary use case scenario of the trolley mechanism in one. It should be noted that this exemplary use case scenario is illustrative only and that no limitations should necessarily be imputed to all embodiments accordingly.

In this example use case scenario, the user purchases substantially conventional wheeled luggage 11. When purchasing the wheeled luggage 11, the user additionally purchase the accessory trolley mechanism 2. The user is able to fasten the trolley mechanism 2 to the base of the wheeled luggage 11, such as by way of slide fastener or other suitable pivotable engagement so as to define the pivot attachment 15 between the trolley base 2 and the wheeled luggage 11.

The trolley base 2 conforms substantially in width and height so as to conform to the rear surface 17 of the wheeled luggage 11. Furthermore, the continuous lateral edges or the discrete raised portions 7, 9 of the trolley base 2 snugly hold the trolley base 2 against the rear surface 17. In embodiments, securement fasteners may be provided to hold the trolley base 2 against the rear surface 17, such as by way of releasable fasteners including hook and loop fasteners, magnetic fasteners or the like, especially those provided towards the distal end of the trolley base 2 away from the pivot 15. In further embodiments, a slide fastener may be provided substantially around the distal and lateral edges of the trolley 2 which may be released so as to release the trolley 2.

As such, the user uses the wheeled luggage 11 in a substantially conventional manner wherein, when loading the luggage 11, the user lies the luggage 11 on the trolley base 2 so as to be able to open the lid defined by the front surface 16 thereof.

While travelling, the user is able to use the wheeled luggage 11 in the normal manner wherein the trolley handle 3 is extended so as to allow for the manoeuvring of the wheeled luggage 11 in the substantially upright configuration is a substantially shown in FIG. 1 on the luggage wheels 5.

Now, should the user require additional luggage carrying capacity, the user deploys the trolley base 2. Specifically, the user pushes the trolley handle 3 in so as to allow the distal raised edge portion 9 to be released. Furthermore, any additional securement would be released also, such as wherein, for example, the user releases any side slide fasteners securing the trolley base 2 to the wheeled luggage 11.

Furthermore, the user would deploy the trolley wheels 4 by pulling them out from their respective recesses so as to click into place in the deployed configuration is a substantially shown in FIGS. 1 and 2. Thereafter, the user would pivot the trolley base 2 about the pivot point 15 until such time that the trolley base 2 was substantially at a right angle with respect to the rear surface 17. Once deployed in this manner, the user would place additional luggage on the upper load-bearing surface 19 of the trolley base 2.

As such, the user is now able to manoeuvre the wheeled luggage 11 wherein the wheeled luggage 11 is supported by the luggage wheels 4 and wherein the trolley base 2 is supported at a proximal end thereof by the luggage wheels 5 and at a distal end thereof by the trolley wheels 4.

For facilitating manoeuvrability, the user may grip additional trolley handles 8 so as to provide additional steering capability. Specifically, the user stand behind the front surface 16 of the wheeled luggage 11 such that the deployed a trolley base 2 extends forwardly in front of the user. As such, and by gripping the additional luggage handles 8 with both hands, the user is able to walk forwards with the trolley base 2 extending in front of the user so as to allow the user to utilise the trolley mechanism in a not a dissimilar manner as that of a conventional shopping cart trolley.

Now, the user may subsequently wish to pull the wheeled luggage 11 in a sled like manner wherein the user would then stow the trolley base 2 and place the wheeled luggage 11 on the rear surface 17 thereof such that the wheeled luggage 11 is supported by the trolley wheels 4 of the trolley base 2 and the rearwardly located luggage wheels 5 which, as alluded to above, may jut out at a substantially 45° angle so as to be able to support the wheeled luggage both in the vertical and horizontal orientations.

Thereafter, the user would unfasten retention fastener 13 so as to allow the pull sled handle 12 to be deployed. Thereafter, by gripping the handle 14 of the pull sled handle 12, the user may walk about pulling the wheeled luggage 11 behind.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the travel luggage industries.

The invention claimed is:

1. A trolley mechanism for wheeled luggage, the wheeled luggage comprising four luggage wheels at a lower surface of the wheeled luggage and a deployable trolley handle at an upper surface of the wheeled luggage such that, in use, the wheeled luggage may be manoeuvred about by the deployable trolley handle in a substantially upright orientation supported by the luggage wheels and wherein the trolley mechanism comprises a deployable trolley deck, the trolley deck being pivotally coupled substantially at the lower surface of the wheeled luggage at a proximal edge of the trolley deck and having at least one trolley wheel at an opposite distal end of the trolley deck such that the deployable trolley deck is pivotally configurable between:
 a stowed configuration wherein the trolley deck lies against a surface of the wheeled luggage; and
 a deployed configuration wherein the trolley deck is deployed at a substantial right angle to the surface such that, when the wheeled luggage is in the substantially upright orientation and supported by the luggage wheels, the trolley deck defines an upper load bearing surface for supporting additional luggage thereon and the trolley deck is supported at the distal end thereof by the at least one trolley wheel, wherein:

the trolley deck comprises a distal raised edge portion;

the trolley deck comprises a length substantially equal to a height of the wheeled luggage such that the distal raised edge portion reaches over a top edge of the wheeled luggage in the stowed configuration;

the deployable trolley handle is located towards the trolley deck; and the distal raised edge portion comprises an aperture through which the deployable trolley handle is able to extend upwardly to retain the trolley deck in the stowed configuration.

2. A trolley mechanism as claimed in claim 1, wherein the trolley deck is releasably fastened to the base of the wheeled luggage.

3. A trolley mechanism as claimed in claim 2, wherein the trolley deck is releasably fastened to the base of the wheeled luggage by way of slide fastener.

4. A trolley mechanism as claimed in claim 1, wherein the at least one trolley wheel is two trolley wheels.

5. A trolley mechanism as claimed in claim 1, wherein the at least one trolley wheel is stowable within an underside recess of the trolley deck.

6. A trolley mechanism as claimed in claim 5, wherein the at least one trolley wheel is configured for deploying from the underside recess when the trolley deck is deployed.

7. A trolley mechanism as claimed in claim 1, wherein the trolley deck is configured for rigidity along an elongate axis of the trolley deck so as to substantially reduce bending under load.

8. A trolley mechanism as claimed in claim 7, wherein the trolley deck comprises at least one rigidity conferring corrugation aligned along the elongate axis of the trolley deck.

9. A trolley mechanism as claimed in claim 1, further comprising a pair of laterally located additional trolley handles located adjacent the deployable trolley handle.

10. A trolley mechanism as claimed in claim 1, further comprising a deployable pull sled handle located on a front surface of the wheeled luggage and wherein, the deployable pull sled handle is configurable in a deployed configuration wherein the deployable pull sled handle may be used to pull the wheeled luggage in a sled like manner when the wheeled luggage is in a horizontal orientation and at least partially supported by the at least one trolley wheel of the trolley deck.

11. A trolley mechanism as claimed in claim 10, wherein a pair of rearwardly located luggage wheels of the four luggage wheels jut at substantially 45° so as to be able to at least partially support the wheeled luggage when the wheeled luggage is both in horizontal and vertical orientations.

* * * * *